US012193980B2

(12) United States Patent
Li et al.

(10) Patent No.: US 12,193,980 B2
(45) Date of Patent: Jan. 14, 2025

(54) FIXING MEMBER, BED SUPPORTING STRUCTURE, AND BED

(71) Applicant: MINEBEA MITSUMI Inc., Nagano (JP)

(72) Inventors: Kui Li, Nagano (JP); Manabu Tanaka, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 0 days.

(21) Appl. No.: 18/690,772

(22) PCT Filed: Sep. 14, 2022

(86) PCT No.: PCT/JP2022/034459
§ 371 (c)(1),
(2) Date: Jun. 18, 2024

(87) PCT Pub. No.: WO2023/042863
PCT Pub. Date: Mar. 23, 2023

(65) Prior Publication Data

US 2024/0398640 A1 Dec. 5, 2024

(30) Foreign Application Priority Data

Sep. 15, 2021 (JP) ................................ 2021-149825

(51) Int. Cl.
*A61G 7/012* (2006.01)
*A61G 13/06* (2006.01)

(52) U.S. Cl.
CPC ............ *A61G 7/012* (2013.01); *A61G 13/06* (2013.01); *A61G 2203/30* (2013.01)

(58) Field of Classification Search
CPC .... A61G 7/012; A61G 2203/10; A61G 7/002; A61G 13/06; A61G 13/02
(Continued)

(56) References Cited

U.S. PATENT DOCUMENTS 6,469,263 B1 * 10/2002 Johnson ............... G01G 19/445 177/144
8,015,638 B2 * 9/2011 Shimada ............. A47C 19/045 108/147
(Continued)

FOREIGN PATENT DOCUMENTS

CN 102316839 A 1/2012
CN 103330574 A 10/2013
(Continued)

OTHER PUBLICATIONS

International Search Report for corresponding International Application No. PCT/JP2022/034459 mailed Nov. 8, 2022.
(Continued)

*Primary Examiner* — Robert G Santos
(74) *Attorney, Agent, or Firm* — CGT IP Law

(57) ABSTRACT

Provided is a fixing member used in a support structure (100) for a bed. The support structure includes a lower frame (10), an upper frame (20), a raising/lowering mechanism (30) configured to raise and lower the upper frame with respect to the lower frame and including a support shaft (312) extending in a width direction of the bed, and a supported member (221, 222) fixed to the upper frame and supported by the support shaft. The support shaft moves in a longitudinal direction of the bed while supporting the supported member when the upper frame is raised and lowered. The fixing member includes a plurality of fixing tools (S11 to S14) configured to fix the supported member to the upper frame. Each of the plurality of fixing tools includes a flexure element (SB) fixed to the upper frame at one end and fixed to the supported member at the other end, and a strain gauge (SG) attached to the flexure element.

10 Claims, 9 Drawing Sheets

(58) Field of Classification Search
USPC ................................................ 5/11, 611, 600
See application file for complete search history.

(56) References Cited

U.S. PATENT DOCUMENTS

| | | | | |
|---|---|---|---|---|
| 10,959,898 | B2 * | 3/2021 | Luybansky | A61G 13/06 |
| 2010/0257671 | A1 | 10/2010 | Shmada et al. | |
| 2011/0296607 | A1 | 12/2011 | Stadlthanner et al. | |
| 2015/0014069 | A1 | 1/2015 | Yu et al. | |
| 2015/0300872 | A1 | 10/2015 | Hirose et al. | |
| 2016/0063846 | A1 | 3/2016 | Lemire et al. | |
| 2019/0125602 | A1 | 5/2019 | Patmore et al. | |
| 2020/0155402 | A1 | 5/2020 | Luybansky | |

FOREIGN PATENT DOCUMENTS

| | | | | |
|---|---|---|---|---|
| CN | 105377208 | A | 3/2016 | |
| CN | 108135364 | A | 6/2018 | |
| EP | 4403155 | A1 * | 7/2024 | A61G 7/005 |
| JP | 2009-207642 | A | 9/2009 | |
| JP | 2012-518456 | A | 8/2012 | |
| JP | 6078645 | B2 | 2/2017 | |
| WO | 2013/108503 | A1 | 7/2013 | |
| WO | 2016/097200 | A1 | 6/2016 | |
| WO | 2017/061590 | A1 | 4/2017 | |

OTHER PUBLICATIONS

Written Opinion for corresponding International Application No. PCT/JP2022/034459 dated Nov. 8, 2022 and English translation.
Office Action dated Aug. 31, 2024 for corresponding Chinese Application No. 202280071545.4 and English translation.
Extended European Search Report dated Oct. 28, 2024 for corresponding European Application No. 22870010.0.

* cited by examiner

FIXING MEMBER, BED SUPPORTING STRUCTURE, AND BED

CROSS-REFERENCE TO RELATED APPLICATIONS

This application is a national stage entry of International Application No. PCT/JP2022/034459 filed on Sep. 14, 2022, which claims the benefit of priority to Japanese Application No. JP2021-149825, filed Sep. 15, 2021, the entire disclosures of which are hereby incorporated herein by reference.

TECHNICAL FIELD

The present invention relates to a fixing member, a support structure for a bed, and a bed.

BACKGROUND ART

In a hospital, a nursing facility, or the like, whether a patient or a resident is present on a bed is determined on the basis of detection of a load applied to the bed, and information such as a weight or a respiration rate of the patient or the like on the bed is acquired.

Further, incorporation of a load sensor for load detection into a support structure supporting the bed has been proposed. For example, Patent Document 1 discloses the arrangement of a plurality of load detectors between a lower frame of a bed and a raising/lowering support mechanism.

CITATION LIST

Patent Literature

Patent Document 1: JP 6078645 B

SUMMARY OF INVENTION

Technical Problem

However, in conventional techniques such as disclosed in Patent Document 1, in order to incorporate the load sensor into the bed, it is necessary to use a load sensor having a special structure or to modify the bed structure. As a result, the manufacturing cost of the bed with a built-in load sensor is high, hindering the widespread use of the bed with built-in load sensor.

In view of the above, it is an object of the present invention to provide a fixing member and a support structure facilitating easy manufacture of a bed having a load detection function.

Solution to Problem

According to a first aspect of the present invention, provided is a fixing member used in a support structure for a bed. The support structure includes a lower frame, an upper frame, a raising/lowering mechanism configured to raise and lower the upper frame with respect to the lower frame and including a support shaft extending in a width direction of the bed, and a supported member fixed to the upper frame and supported by the support shaft. The support shaft moves in a longitudinal direction of the bed while supporting the supported member when the upper frame is raised and lowered. The fixing member includes a plurality of fixing tools configured to fix the supported member to the upper frame. Each of the plurality of fixing tools includes a flexure element fixed to the upper frame at one end and fixed to the supported member at the other end, and a strain gauge attached to the flexure element.

According to a second aspect of the present invention, provided is a support structure for a bed. The support structure includes a lower frame, an upper frame, a raising/lowering mechanism configured to raise and lower the upper frame with respect to the lower frame and including a support shaft extending in a width direction of the bed, a supported member supported by the support shaft, and a fixing tool configured to fix the supported member to the upper frame. The fixing tool includes a flexure element fixed to the upper frame at one end and fixed to the supported member at the other end, and a strain gauge attached to the flexure element. The support shaft moves in a longitudinal direction of the bed while supporting the supported member when the upper frame is raised and lowered.

Advantageous Effects of Invention

According to a fixing member and a support structure for a bed of the present invention, it is possible to easily manufacture a bed having a load detection function.

BRIEF DESCRIPTION OF DRAWINGS

FIG. 1(*a*) illustrates a state with an upper frame in a lowered position, and FIG. 1(*b*) illustrates a state with the upper frame in a raised position. In FIG. 1(*a*) and FIG. 1(*b*), a portion of the configuration is see-through to explain an operation of the bed.

FIG. 6(*b*) is a side view illustrating the structure of the sliding bracket fixed to the upper frame using the four load sensors.

FIG. 8(*b*) is a side view illustrating the structure of the fixed bracket fixed to the upper frame using the four load sensors.

FIG. 9(*b*) is a side view illustrating the modified example of the structure of the sliding bracket fixed to the upper frame using the load sensors.

DESCRIPTION OF EMBODIMENTS

Embodiments

A bed BD, a support structure 100, and a load sensor kit (fixing member) according to an embodiment of the present invention will be described with reference to FIG. 1 to FIG. 8.

Figure 1:
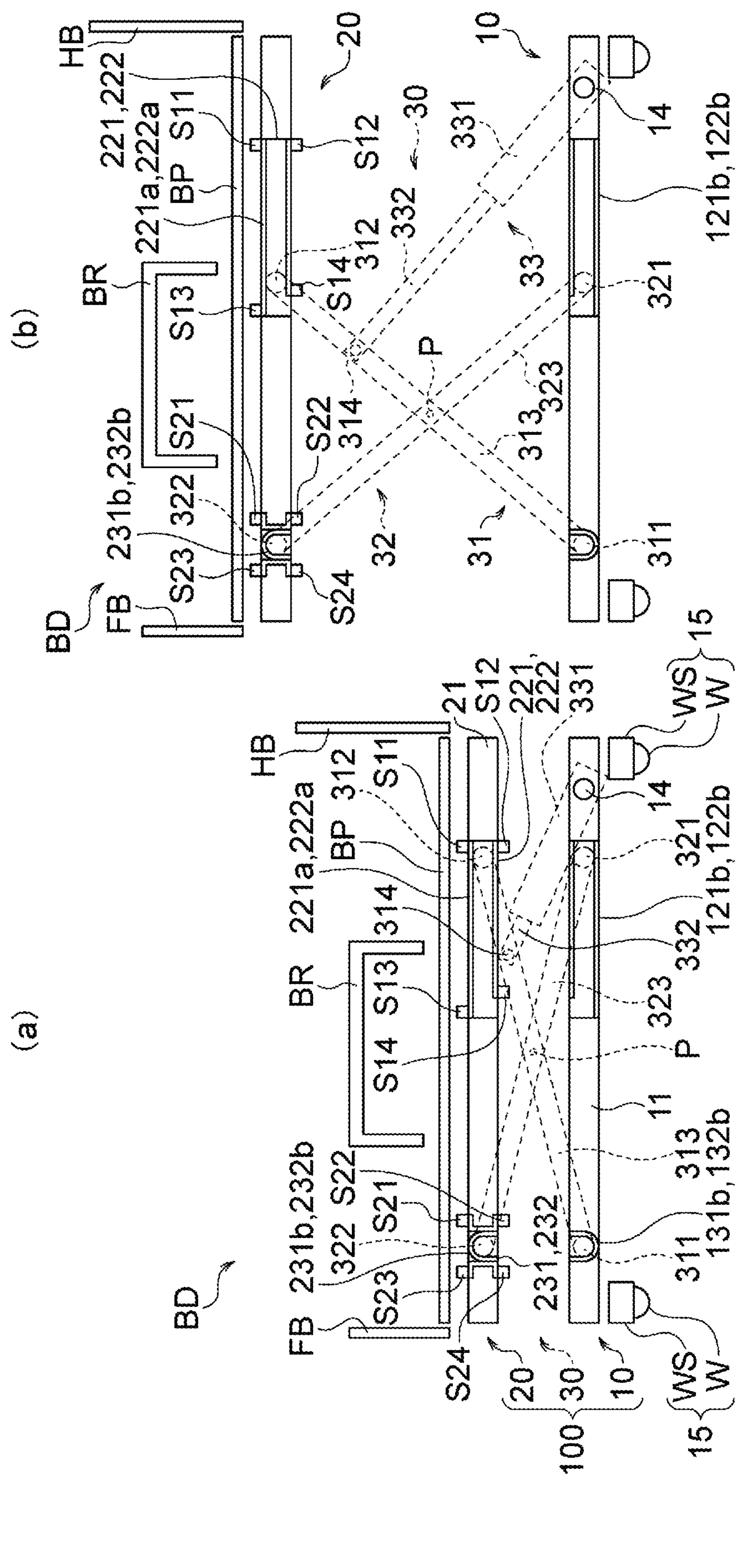
FIG. 1(*a*) and FIG. 1(*b*) are schematic views of a bed according to an embodiment of the present invention, as viewed from a horizontal direction.

As illustrated in FIG. 1(*a*) and FIG. 1(*b*), the bed BD mainly includes the support structure 100 including a lower mechanism 10, an upper mechanism 20, and a raising/lowering mechanism 30, and a bed plate BP, a headboard HB, a footboard FB, and a pair of bed rails BR attached to the upper mechanism 20 of the support structure 100.

In the following description, a longitudinal direction of the bed BD is referred to as a vertical direction of the bed BD and the support structure 100, and a width direction of the bed BD is referred to as a horizontal direction of the bed BD and the support structure 100. In the vertical direction, a side where the headboard HB is positioned is referred to as a head side, and a side where the footboard FB is positioned is referred to as a leg side. In the horizontal direction, a left side and a right side when the head side is viewed from the leg side in the vertical direction are referred to as a left side and a right side, respectively. A direction orthogonal to the vertical direction and the horizontal direction is referred to as an up-down direction.

Figure 2:
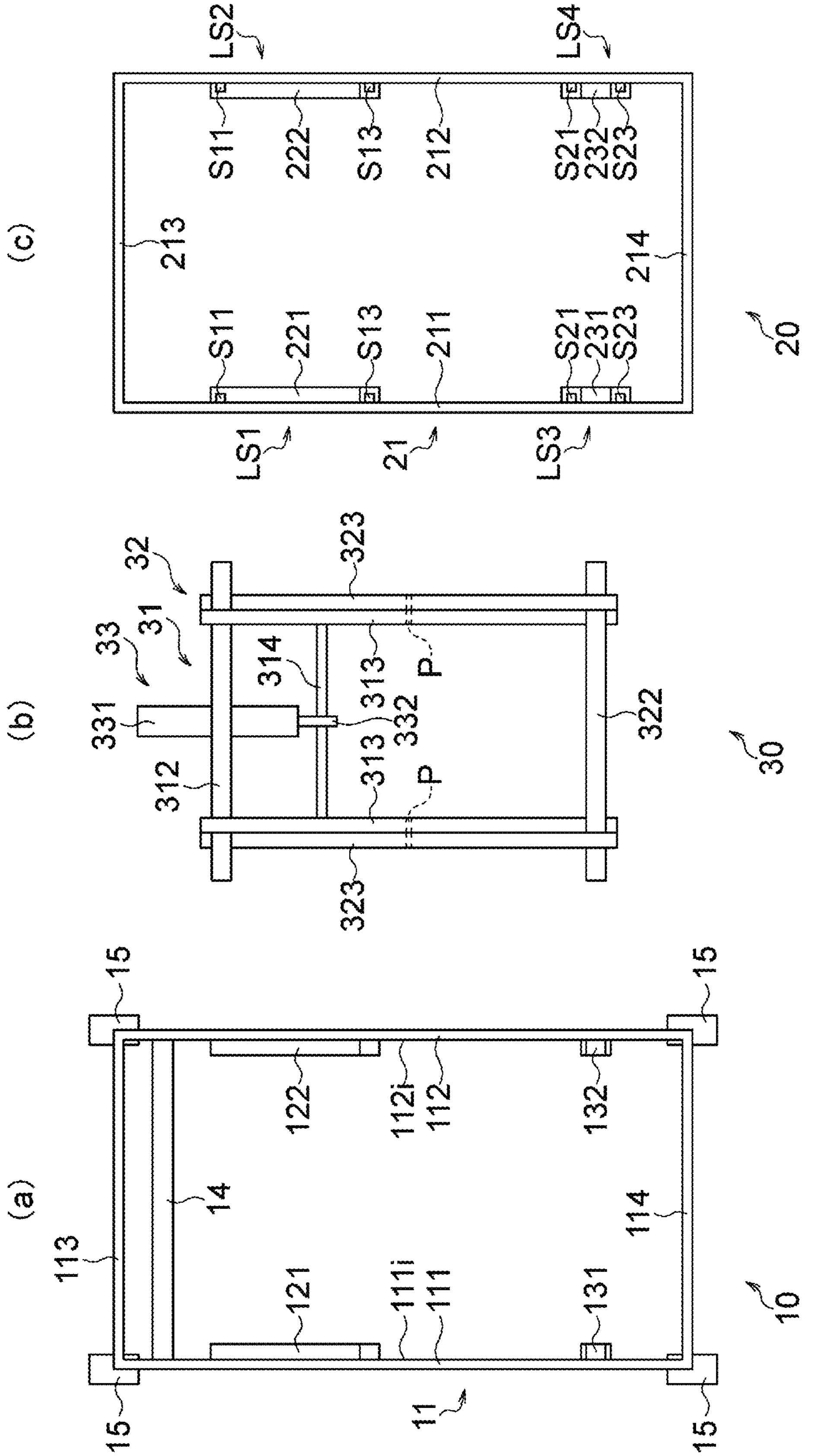
FIG. 2(*a*) is a plan view of a lower mechanism, FIG. 2(*b*) is a plan view of a raising/lowering mechanism, and FIG. 2(*c*) is a plan view of an upper mechanism.

As illustrated in FIG. 2(*a*), the lower mechanism 10 mainly includes a lower frame (base frame) 11, sliding brackets 121, 122, fixed brackets 131, 132, an actuator support beam 14, and four caster parts 15.

The lower frame 11 is a frame-shaped member having a rectangular shape in plan view, and includes a first portion 111 and a second portion 112 extending in the vertical direction of the support structure 100, and a third portion 113 and a fourth portion 114 extending in the horizontal direction of the support structure 100. Each of the first portion 111 to the fourth portion 114 is an elongated member having a rectangular cross section.

Figure 3:
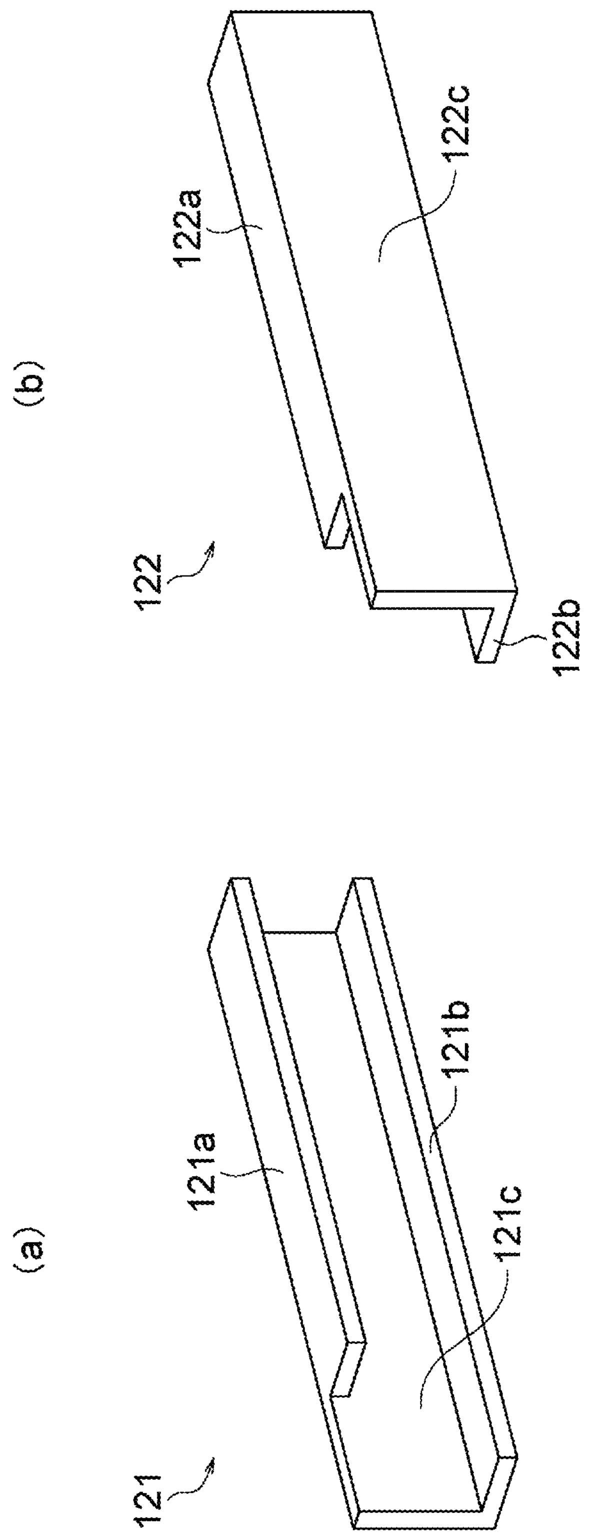
FIG. 3(*a*) and FIG. 3(*b*) are perspective views of sliding brackets attached to a lower frame.

The sliding bracket 121 is an elongated member and, as illustrated in FIG. 3(*a*), has a shape of an upper plate part 121*a*, a lower plate part 121*b*, and a vertical plate part 121*c*, each being an elongated flat plate, coupled in a C-shape (U-shape) as viewed in the elongated direction. A size of the upper plate part 121*a* in the elongated direction is smaller than sizes of the lower plate part 121*b* and the vertical plate part 121*c* in the elongated direction.

The sliding bracket 122 is also an elongated member and, as illustrated in FIG. 3(*b*), has a shape of an upper plate part 122*a*, a lower plate part 122*b*, and a vertical plate part 122*c*, each being an elongated flat plate, coupled in a C-shape (U-shape) as viewed in the elongated direction. A size of the upper plate part 122*a* in the elongated direction is smaller than sizes of the lower plate part 122*b* and the vertical plate part 122*c* in the elongated direction.

The sliding bracket 121 and the sliding bracket 122 are mirror-symmetrical with respect to a plane parallel to the vertical plate parts 121*c*, 122*c*.

The sliding brackets 121, 122 are attached to the lower frame 11 at the head side of a central part of the support structure 100 in the vertical direction. The sliding brackets 121, 122 are fixed to the first portion 111 and the second portion 112, respectively, and thus the elongated direction of the sliding brackets 121, 122 coincides with the vertical direction of the support structure 100. Specifically, an outer surface of the vertical plate part 121*c* of the sliding bracket 121 abuts against and is welded to an inner side surface 111*i* of the first portion 111, and an outer surface of the vertical plate part 122*c* of the sliding bracket 122 abuts against and is welded to an inner side surface 112*i* of the second portion 112.

Figure 4:
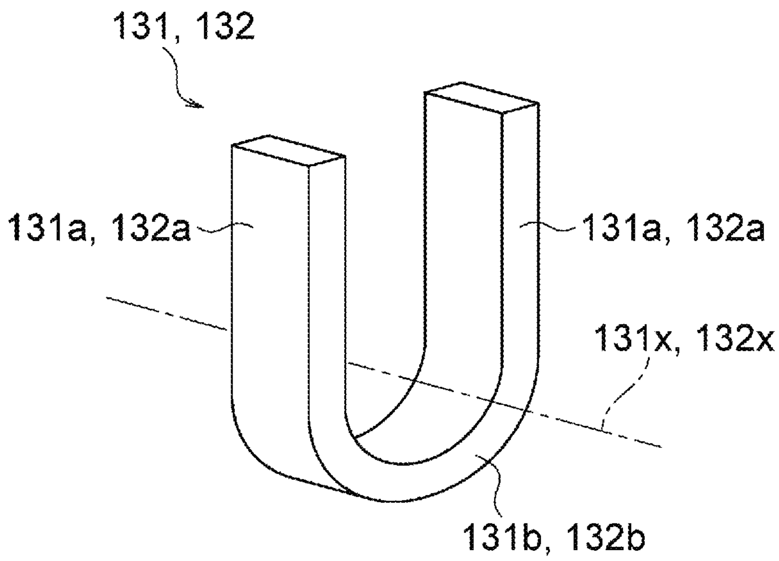
FIG. 4 is a perspective view of a fixed bracket attached to the lower frame.

As illustrated in FIG. 4, the fixed bracket 131 includes a pair of flat plate parts 131*a* opposing each other, and a curved plate part 131*b* curved in an arc shape about an axis 131*x* and connecting lower end parts of the pair of flat plate parts 131*a*. The fixed bracket 13 is substantially U-shaped as viewed in the direction of the axis 131*x*. Similarly, the fixed bracket 132 includes a pair of flat plate parts 132*a* opposing each other, and a curved plate part 132*b* curved in an arc shape about an axis 132*x* and connecting lower end parts of the pair of flat plate parts 132*a*. The fixed bracket 132 is substantially U-shaped as viewed in the direction of the axis 132*x*.

The fixed brackets 131, 132 are attached to the lower frame 11 at positions on the leg side of the central part of the support structure 100 in the vertical direction. The fixed bracket 131 is fixed to the inner side surface 111*i* of the first portion 111 by welding with the axis 131*x* aligned with the horizontal direction of the support structure 100. The fixed bracket 132 is fixed to the inner side surface 112*i* of the second portion 112 by welding with the axis 132*x* aligned with the horizontal direction of the support structure 100.

The actuator support beam 14 is an elongated member having a circular cross section and extending in the horizontal direction of the support structure 100. A left end part of the actuator support beam 14 is fixed to the first portion 111 of the lower frame 11 at the head side of the sliding bracket 121. A right end part of the actuator support beam 14 is fixed to the second portion 112 of the lower frame 11 at the head side of the sliding bracket 122.

One caster part 15 is provided at each of four corners of the lower frame 11. As illustrated in FIG. 1(*a*), each of the four caster parts 15 includes a wheel support part WS attached to the lower frame 11 rotatably about a vertical axis, and a wheel W attached to the wheel support part WS rotatably about a horizontal axis.

As illustrated in FIG. 2(*c*), the upper mechanism 20 mainly includes an upper frame (center frame) 21, sliding brackets 221, 222, fixed brackets 231, 232, and a plurality of load sensors for attaching the sliding brackets 221, 222 and the fixed brackets 231, 232 to the upper frame 21.

The upper frame 21 is a frame-shaped member having a rectangular shape in plan view, and includes a first portion 211 and a second portion 212 extending in the vertical direction of the support structure 100, and a third portion 213 and a fourth portion 214 extending in the horizontal direction of the support structure 100. Each of the first portion 211 to the fourth portion 214 is an elongated member having a rectangular cross section.

Figure 5:
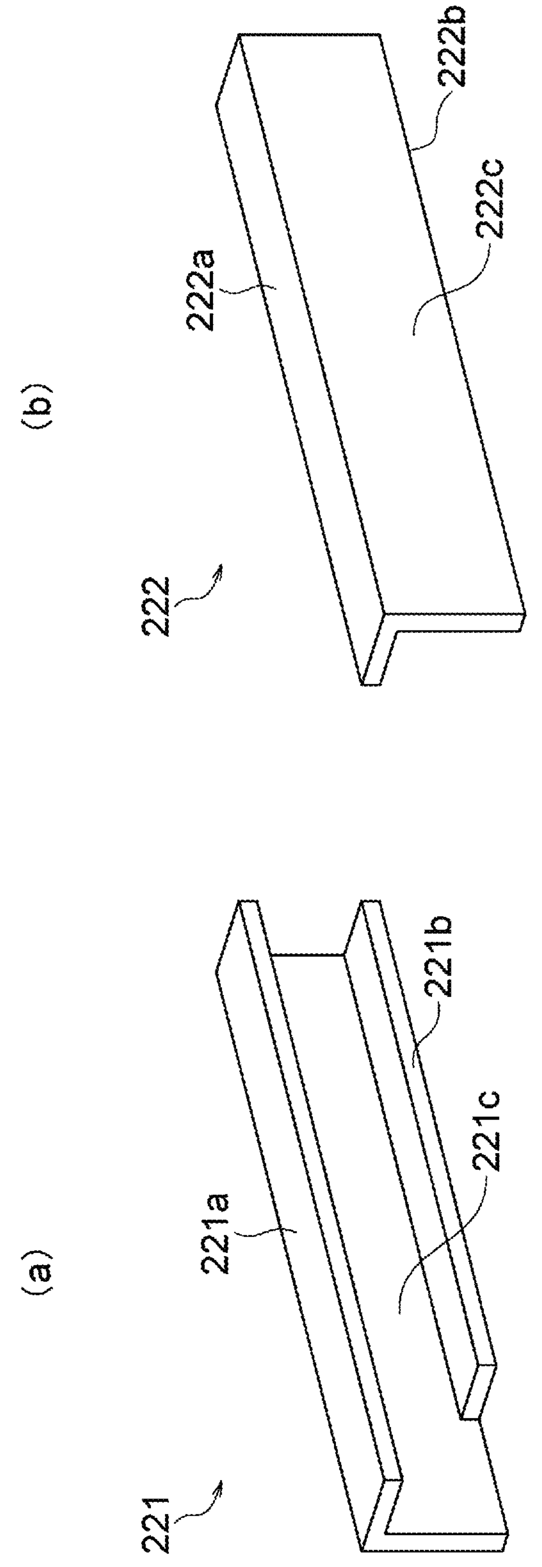
FIG. 5(*a*) and FIG. 5(*b*) are perspective views of sliding brackets attached to the upper frame.

The sliding bracket (supported member) 221 is an elongated member and, as illustrated in FIG. 5(*a*), has a shape of an upper plate part 221*a*, a lower plate part 221*b*, and a vertical plate part 221*c*, each being an elongated flat plate, coupled in a C-shape (U-shape) as viewed in the elongated direction. A size of the lower plate part 221*b* in the elongated direction is smaller than sizes of the upper plate part 221*a* and the vertical plate part 221*c* in the elongated direction. Therefore, in the vicinity of one end part of the upper plate part 221*a* in the elongated direction, the lower plate part 221*b* opposing the upper plate part 221*a* is not present.

The sliding bracket (supported member) 222 is also an elongated member and, as illustrated in FIG. 5(*b*), has a shape of an upper plate part 222*a*, a lower plate part 222*b*, and a vertical plate part 222*c*, each being an elongated flat plate, coupled in a C-shape (U-shape) as viewed in the elongated direction. A size of the lower plate part 222*b* in the elongated direction is smaller than sizes of the upper plate part 222*a* and the vertical plate part 222*c* in the elongated direction. Therefore, in the vicinity of one end part of the upper plate part 222*a* in the elongated direction, the lower plate part 222*b* opposing the upper plate part 222*a* is not present. The sliding bracket 221 and the sliding bracket 222 are mirror-symmetrical with respect to a plane parallel to the vertical plate parts 221*c*, 222*c*.

Figure 6:
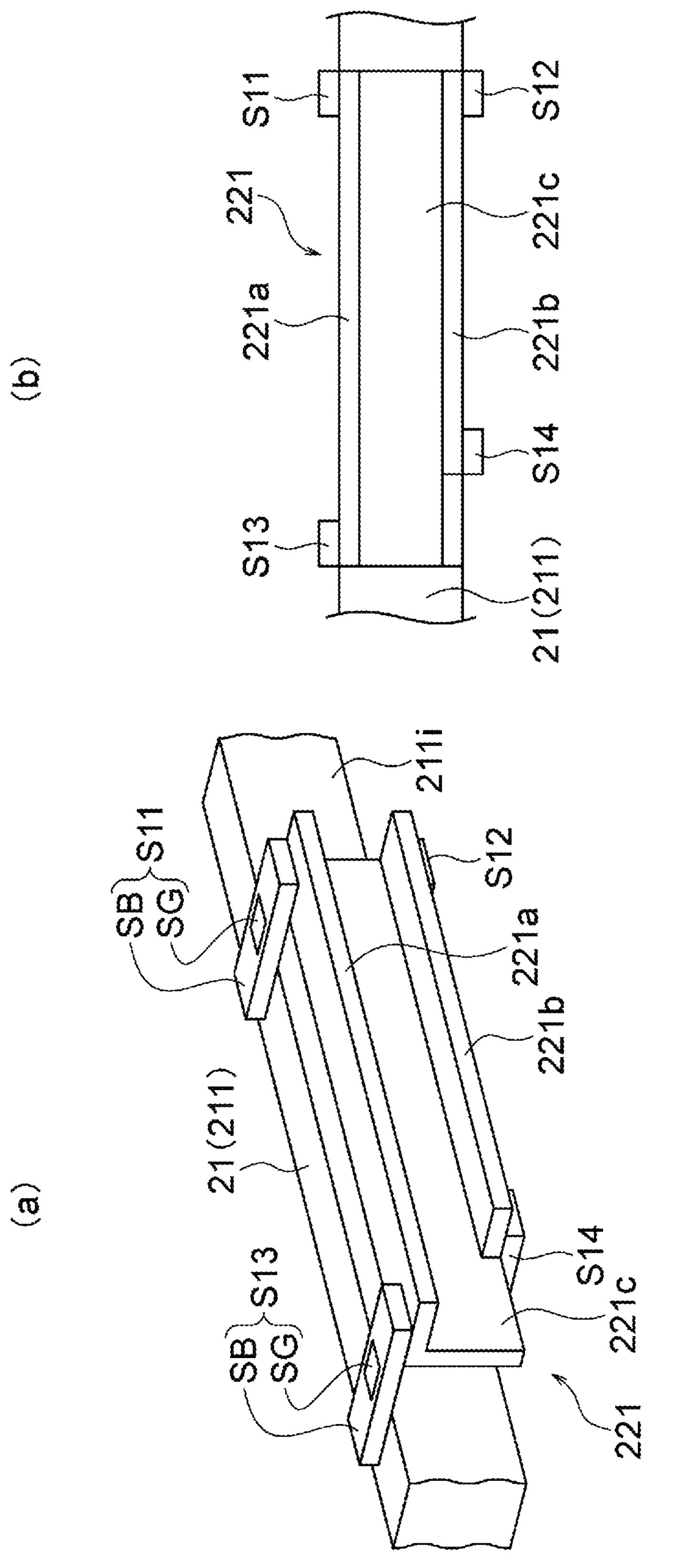
FIG. 6(*a*) is a perspective view illustrating a structure of the sliding bracket fixed to the upper frame using four load sensors.

As illustrated in FIG. 2(*c*), FIG. 6(*a*), and FIG. 6(*b*), the sliding bracket 221 is attached to the first portion 211 of the upper frame 21 by four load sensors (attachment tools) S11, S12, S13, S14 at the head side of the central part of the support structure 100 in the vertical direction. Each of the load sensors S11 to S14 includes a flexure element SB having a beam shape and a strain gauge SG adhered to the flexure element SB.

The sliding bracket 221 is attached to the upper frame 21 using the four load sensors S11 to S14 specifically as follows.

The sliding bracket 221 is disposed with the elongated direction of the sliding bracket 221 aligned with the vertical direction of the support structure 100 (that is, the longitudinal direction of the bed BD). In this state, an upper surface of the first portion 211 of the upper frame 21 and an upper surface of the upper plate part 221*a* are flush, and a lower surface of the first portion 211 of the upper frame 21 and a lower surface of the lower plate part 221*b* are flush.

The four load sensors S11, S12, S13, S14 are respectively provided at the sliding bracket 221 at an upper side of one end side in the elongated direction, a lower side of one end side in the elongated direction, an upper side of the other end side in the elongated direction, and a lower side of the other end side in the elongated direction.

One end of the flexure element SB of the load sensor S11 is fixed to the upper plate part 221*a* at one end side of the sliding bracket 221 in the elongated direction, and the other end is fixed to the upper surface of the first portion 211. One end of the flexure element SB of the load sensor S12 is fixed to the lower plate part 221*b* at one end side of the sliding bracket 221 in the elongated direction, and the other end is fixed to the lower surface of the first portion 211. One end of the flexure element SB of the load sensor S13 is fixed to the upper plate part 221*a* at the other end side of the sliding bracket 221 in the elongated direction, and the other end is fixed to the upper surface of the first portion 211. One end of the flexure element SB of the load sensor S14 is fixed to the lower plate part 221*b* at the other end side of the sliding bracket 221 in the elongated direction, and the other end is fixed to the lower surface of the first portion 211.

In this state, the inner side surface 211*i* of the first portion 211 and the vertical plate part 221*c* are disposed parallel to each other with a gap in the horizontal direction. The gap may be, for example, about 5 mm to 15 mm.

The sliding bracket 222 is also, by the same mode as the mode of the sliding bracket 221, attached to the second portion 212 of the upper frame 21 by the four load sensors S11, S12, S13, S14 at the head side of the central part of the support structure 100 in the vertical direction.

Figure 7:
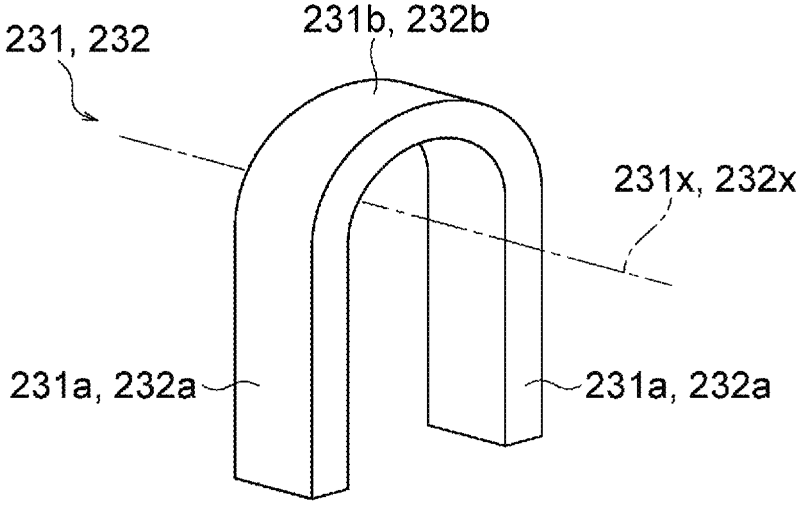
FIG. 7 is a perspective view of the fixed bracket attached to the upper frame.

As illustrated in FIG. 7, the fixed bracket 231 (secondary supported member) includes a pair of flat plate parts 231*a* opposing each other, and a curved plate part 231*b* curved in an arc shape about an axis 231*x* and connecting upper end parts of the pair of flat plate parts 231*a*. The fixed bracket 231 is substantially U-shaped as viewed in the direction of the axis 231*x*. Similarly, the fixed bracket (secondary supported member) 232 also includes a pair of flat plate parts 232*a* opposing each other, and a curved plate part 232*b* curved in an arc shape about an axis 232*x* and connecting upper end parts of the pair of flat plate parts 232*a*. The fixed bracket 232 is substantially U-shaped as viewed in the direction of the axis 232*x*.

Figure 8:
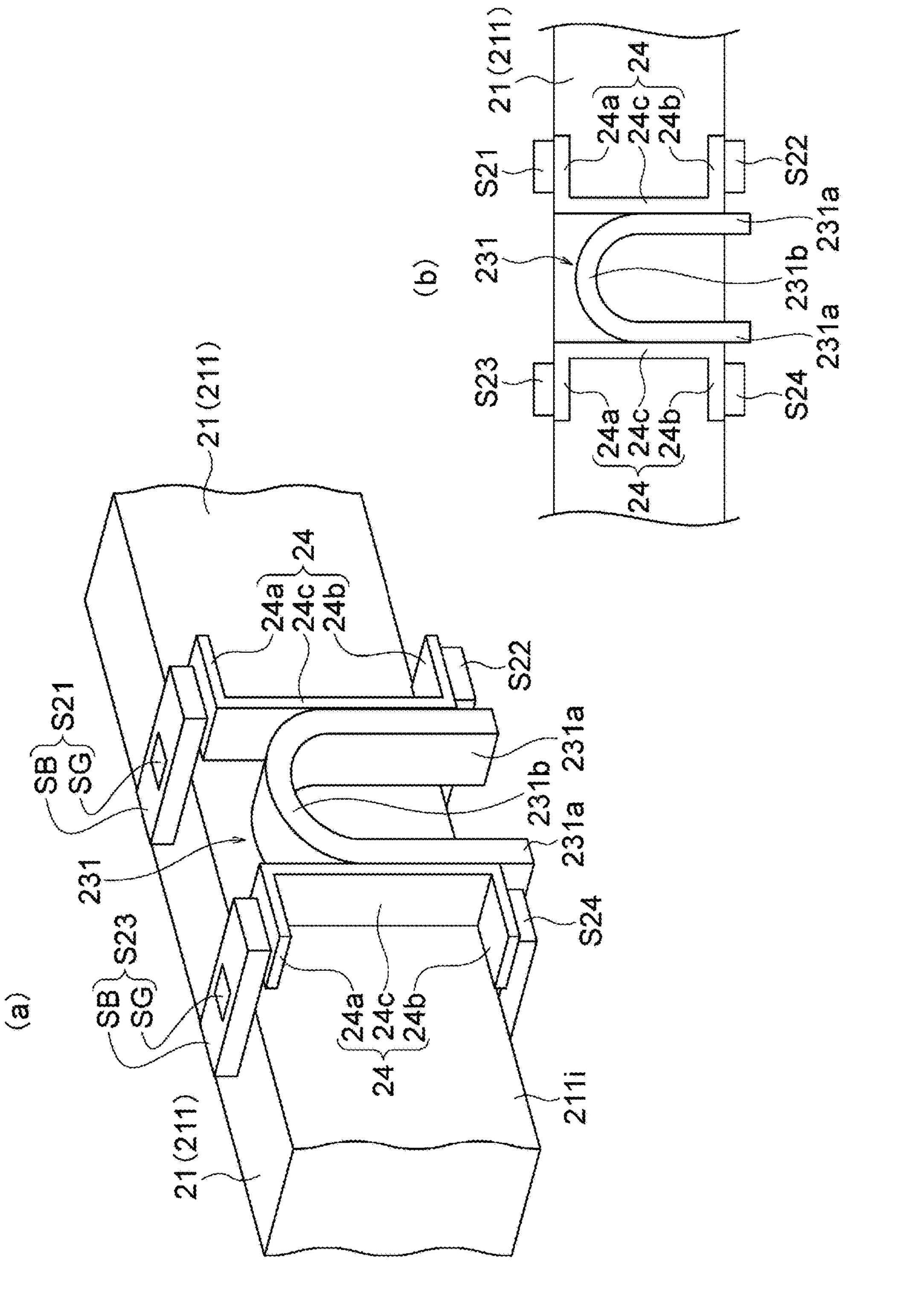
FIG. 8(*a*) is a perspective view illustrating a structure of the fixed bracket fixed to the upper frame using four load sensors.

As illustrated in FIG. 2(*c*), FIG. 8(*a*), and FIG. 8(*b*), the fixed bracket 231 is attached to the first portion 211 of the upper frame 21 via two couplers 24 and four load sensors (secondary attachment tools) S21, S22, S23, S24 at the leg side of the central part of the bed BD in the longitudinal direction.

Each of the two couplers 24 is a member having a C-shape (U-shape) in a side view and including an upper plate part 24*a*, a lower plate part 24*b* opposing the upper plate part 24*a*, and a vertical plate part 24*c* connecting the upper plate part 24*a* and the lower plate part 24*b*.

Each of the four load sensors S21 to S24 has the same structure as the structure of each of the load sensors S11 to S14 and includes the flexure element SB having a beam shape and the strain gauge SG adhered to the flexure element SB.

The fixed bracket 231 is attached to the upper frame 21 using the two couplers 24 and the four load sensors S21 to S24 specifically as follows.

Outer surfaces of the vertical plate parts 24*c* of the couplers 24 abut against and are fixed to respective outer surfaces of the pair of flat plate parts 231*a* of the fixed bracket 231. The fixed bracket 231 and the two couplers 24 are disposed with the curved plate part 231*b* of the fixed bracket 231 protruding upward. In this state, the upper surface of the first portion 211 of the upper frame 21 and upper surfaces of the upper plate parts 24*a* of the two couplers 24 are flush, and the lower surface of the first portion 211 of the upper bracket 21 and lower surfaces of the lower plate parts 24*b* of the two couplers 24 are flush.

The four load sensors S21, S22, S23, S24 are respectively provided at an upper side and a lower side of one coupler 24 and at an upper side and a lower side of the other coupler 24.

One end of the flexure element SB of the load sensor S21 is fixed to the upper plate part 24*a* of one coupler 24, and the other end is fixed to the upper surface of the first portion 211. One end of the flexure element SB of the load sensor S22 is fixed to the lower plate part 24*b* of one coupler 24, and the other end is fixed to the lower surface of the first portion 211. One end of the flexure element SB of the load sensor S23 is fixed to the upper plate part 24*a* of the other coupler 24, and the other end is fixed to the upper surface of the first portion 211. One end of the flexure element SB of the load sensor S24 is fixed to the lower plate part 24*b* of the other coupler 24, and the other end is fixed to the lower surface of the first portion 211.

In this state, the inner side surface 211*i* of the first portion 211 and the fixed bracket 231 are disposed parallel to each other with a gap in the horizontal direction. The gap may be, for example, about 5 mm to 15 mm.

As with the fixed bracket 231, the fixed bracket 232 is also attached to the second portion 212 of the upper frame 21 via the two couplers 24 and the four load sensors S21, S22, S23, S24 at the leg side of the central part of the support structure 100 in the vertical direction.

As illustrated in FIG. 2(*b*), the raising/lowering mechanism 30 mainly includes an inner arm part 31, an outer arm part 32, and an actuator 33.

As illustrated in FIG. 1(*a*), FIG. 1(*b*), and FIG. 2(*b*), the inner arm part 31 includes a lower shaft 311 (below an upper shaft 322 (described below) of the outer arm part 32 in FIG. 2(*b*); not illustrated), an upper shaft 312, a pair of inner arms 313, and an actuator coupling beam 314.

The lower shaft 311 is an elongated member having a circular cross section and extending in the horizontal direction of the support structure 100. A left end part of the lower shaft 311 abuts against an upper surface of the curved plate part 131*b* of the fixed bracket 131 fixed to the first portion 111 of the lower frame 11, and is supported by the fixed bracket 131. A right end part of the lower shaft 311 abuts against an upper surface of a curved plate part 132*b* of the fixed bracket 132 fixed to the second portion 112 of the lower frame 11, and is supported by the fixed bracket 132.

The upper shaft (support shaft) 312 is an elongated member having a circular cross section and extending in the horizontal direction of the support structure 100. A left end part of the upper shaft 312 abuts against a lower surface of the upper plate part 221*a* of the sliding bracket 221 fixed to the first portion 211 of the upper frame 21 and supports the upper mechanism 20 via the sliding bracket 221. A right end part of the upper shaft 312 abuts against a lower surface of the upper plate part 222*a* of the sliding bracket 222 fixed to the second portion 212 of the upper frame 21 and supports the upper mechanism 20 via the sliding bracket 222.

Each of the pair of inner arms 313 is an elongated member having a rectangular cross section. One of the pair of inner arms 313 is connected to the vicinity of the left end part of the lower shaft 311 at one end part, and connected to the vicinity of the left end part of the upper shaft 312 at the other end part. The other of the pair of inner arms 313 is connected to the vicinity of the right end part of the lower shaft 311 at one end part, and connected to the vicinity of the right end part of the upper shaft 312 at the other end part.

The actuator coupling beam 314 is an elongated member having a circular cross section and extending in the horizontal direction of the support structure 100. A left end part of the actuator coupling beam 314 is connected to one of the pair of inner arms 313 at a substantially intermediate part between a central part of the inner arm 313 in the longitudinal direction and a connection part between the inner arm 313 and the upper shaft 312. A right end part of the actuator coupling beam 314 is connected to the other of the pair of inner arms 313 at a substantially intermediate part between a central part of the inner arm 313 in the longitudinal direction and a connection part between the inner arm 313 and the upper shaft 312.

The outer arm part 32 includes a lower shaft 321 (below the upper shaft 312 (described below) of the inner arm part 31 in FIG. 2(*b*); not illustrated), the upper shaft 322, and a pair of outer arms 323.

The lower shaft 321 is an elongated member having a circular cross section and extending in the horizontal direction of the support structure 100. A left end part of the lower shaft 321 abuts against the lower plate part 121*b* of the sliding bracket 121 fixed to the first portion 111 of the lower frame 11, and is supported by the sliding bracket 121. A right end part of the lower shaft 321 abuts against an upper surface of the lower plate part 122*b* of the sliding bracket 122 fixed to the second portion 112 of the lower frame 11, and is supported by the sliding bracket 122.

The upper shaft (secondary support shaft) 322 is an elongated member having a circular cross section and extending in the horizontal direction of the support structure 100. A left end part of the upper shaft 322 abuts against a lower surface of the curved plate part 231*b* of the fixed bracket 231 fixed to the first portion 211 of the upper frame 21, and supports the upper mechanism 20 via the fixed bracket 231. A right end part of the upper shaft 322 abuts against a lower surface of the curved plate part 232*b* of the fixed bracket 232 fixed to the second portion 212 of the upper frame 21, and supports the upper mechanism 20 via the fixed bracket 232.

Each of the pair of outer arms 323 is an elongated member having a rectangular cross section. One of the pair of outer arms 323 is connected to the vicinity of the left end part of the lower shaft 321 at one end part, and connected to the vicinity of the left end part of the upper shaft 322 at the other end part. The other of the pair of outer arms 323 is connected to the vicinity of the right end part of the lower shaft 321 at one end part, and connected to the vicinity of the right end part of the upper shaft 322 at the other end part.

The inner arm part 31 and the outer arm part 32 are pivotally coupled to each other. Specifically, in the horizontal direction of the support structure 100, the inner arm 313 and the outer arm 323 positioned at the left side are pivotally coupled by a horizontal pin P at respective central parts in the longitudinal direction, and the inner arm 313 and the outer arm 323 positioned at the right side are pivotally coupled by the horizontal pin P at respective central parts in the longitudinal direction.

The actuator 33 includes a cylinder 331 and a rod 332 extended and contracted by the cylinder 331. The actuator 33 may be, for example, an electric actuator, a hydraulic actuator, or a pneumatic actuator.

The cylinder 331 is pivotally supported by the actuator support beam 14 of the lower mechanism 10. A distal end part of the rod 332 is pivotally coupled to the actuator coupling beam 314 of the inner arm part 31.

Each of the bed plate BP, the headboard HB, the footboard FB, and the pair of bed rails BR is detachably attached to the upper frame 21 via an attachment part (not illustrated) provided at the upper frame 21 of the upper mechanism 20 (FIG. 1(*a*) and FIG. 1(*b*)).

In the present embodiment, a total of eight load sensors S11 to S14 for fixing the sliding brackets 221, 222 to the upper frame 21 and a total of eight load sensors S21 to S24 for fixing the fixed brackets 231, 232 to the upper frame 21 constitute a load sensor kit (fixing member).

Raising/Lowering of Upper Mechanism 20

In the support mechanism 100 having the structure described above, the upper mechanism 20 is raised and lowered as follows.

When the upper mechanism 20 is in a lowered position (lowest position possible of the upper mechanism 20; FIG. 1(*a*)), the rod 332 of the actuator 33 is mostly accommodated in an interior of the cylinder 331. When the actuator 33 is driven in this state, the rod 332 is pushed out from the cylinder 331, and the rod 332 presses the actuator coupling beam 314 of the inner arm part 31 obliquely upward.

As a result, the pair of inner arms 313 rotate about the lower shaft 311 supported by the fixed brackets 131, 132 of the lower mechanism 10, and the upper shaft 312 sliding in the sliding brackets 221, 222 of the upper mechanism 20 presses the sliding brackets 221, 222 upward.

At the same time, the pair of outer arms 323 pivotally coupled to the pair of inner arms 313 rotate about the upper shaft 322 supported by the fixed brackets 231, 232 of the upper mechanism 20, and the lower shaft 321 sliding in the sliding brackets 121, 122 of the lower mechanism 10 presses the sliding brackets 121, 122 downward. Then, in accordance with this, the upper shaft 322 presses the fixed brackets 231, 232 of the upper mechanism 20 upward.

In this way, as the rod 332 is pushed out by the cylinder 331, the pair of inner arms 313 and the pair of outer arms 323 pivot, and the upper mechanism 20 rises. With the rod 332 fully pushed out, the upper mechanism 20 reaches a raised position (highest position possible of the upper mechanism 20; FIG. 1(*b*)). On the other hand, as the rod 332 is accommodated in the cylinder 331, the upper mechanism 20 lowers.

Here, as illustrated in FIG. 1(*a*) and FIG. 1(*b*), the load sensors S11 to S14 are provided outside a movable range of the upper shaft 312 of the sliding brackets 221, 222. That is, the load sensors S11, S12 attached to the sliding brackets 221, 222 at positions on the head side of the support structure 100 are disposed at the head side of a center of the upper shaft 312 when the upper mechanism 20 is in the lowered position (that is, points where the loads of the brackets 221, 222 act on the load sensors S11, S12 are positioned at the head side of the center of the upper shaft 312). Further, the load sensors S13, S14 attached to the sliding brackets 221, 222 at positions on the leg side of the support structure 100 are disposed at the leg side of the center of the upper shaft 312 when the upper mechanism 20 is in a raised position (that is, points where the loads of the brackets 221, 222 act on the load sensors S13, S14 are positioned at the leg side of the center of the upper shaft 312).

By arranging the load sensors S11 to S14 in this manner, it is possible to detect the load with high accuracy even when the upper mechanism 20 is in any position (height) including the lowered position and the raised position. The reason is as follows.

In the detection of the load of a subject on the bed BD using the load sensors S11 to S14, the detected values of the load sensors S11 to S14 are added together (details described below). At this time, when the detected values of the load sensors S11 to S14 are added with the load sensors S11 to S14 being disposed only at one side of the upper shaft 312 in the vertical direction, influences of placement deviation errors (errors occurring in the detected values of the load sensors according to distances between the load sensors and the subject) in the respective load sensors S11 to S14 are also added, making the value greater.

In response, in the present embodiment, when the distances between the upper shaft 312 and the load sensors S11, S12 increase with the movement of the upper shaft 312, increasing the placement deviation errors of the load sensors S11, S12, the distances between the upper shaft 312 and the load sensors S13, S14 decrease, decreasing the placement deviation errors of the load sensors S13, S14. On the contrary, when the distances between the upper shaft 312 and the load sensors S13, S14 increase, increasing the placement deviation errors of the load sensors S13, S14, the distances between the upper shaft 312 and the load sensors S11, S12 decrease, decreasing the placement deviation errors of the load sensors S11, S12. Thus, by providing the load sensors S11 to S14 outside the movable range of the upper shaft 312 of the sliding brackets 221, 222, the load sensors are disposed at both sides of the upper shaft 312 regardless of the position of the upper shaft 312, and the influences of the placement deviation errors are canceled and suppressed.

Load Measurement of Subject S on Bed BD

In the bed BD having the structure described above, the load of a subject S on the bed BD is measured (detected) as follows.

As illustrated in FIG. 2(*c*), the load sensors S11 to S14 fixing the sliding bracket 221 to the upper frame 21 constitute a first load detection unit LS1. A calculation unit of the support structure 100 (not illustrated; attached to the upper frame 21, for example) acquires an output value of the first load detection unit LS1 by adding the output values of the load sensors S11 to S14 of the first load detection unit LS1.

Similarly, the load sensors S11 to S14 fixing the sliding bracket 222 to the upper frame 21 constitute a second load detection unit LS2, and the calculation unit acquires an output value of the second load detection unit LS2 by adding the output values of the load sensors S11 to S14 of the second load detection unit LS2. The load sensors S21 to S24 fixing the fixed bracket 231 to the upper frame 21 constitute a third load detection unit LS3, and the calculation unit acquires an output value of the third load detection unit LS3 by adding the output values of the load sensors S21 to S24 of the third load detection unit LS3. The load sensors S21 to S24 fixing the fixed bracket 232 to the upper frame 21 constitute a fourth load detection unit LS4, and the calculation unit acquires an output value of the fourth load detection unit LS4 by adding the output values of the load sensors S21 to S24 of the fourth load detection unit LS4.

For example, the calculation unit calculates a weight of the subject on the bed BD by adding the output values of the first load detection unit LS1 to the fourth load detection unit LS4. In addition, for example, a center-of-gravity position of the subject on the bed BD is calculated using the output values of the first load detection unit LS1 to the fourth load detection unit LS4.

The advantageous effects of this support structure 100 of the present embodiment are summarized below.

In the support structure 100 of the present embodiment, the sliding brackets 221, 222 and the fixed brackets 231, 232 are fixed to the upper frame 21 using the load sensors S11 to S14 and S21 to S24, and thus a load detection unit detecting the load of the subject on the bed is built into the structure supporting the bed. Accordingly, the support structure for a bed having a load detection function can be easily manufactured without requiring the manufacture of a bracket or a load sensor having a special structure.

In the support structure 100 of the present embodiment, the brackets using the load sensors S11 to S14 and S21 to S24 are fixed to the frame at the upper mechanism 20, not the lower mechanism 10. Accordingly, the entire load of the subject on the bed plate BP of the bed BD is transmitted to any one of the load sensors S11 to S14 and S21 to S24, making it possible to detect the load of the subject with high accuracy. If the brackets using the load sensors S11 to S14 and S21 to S24 were fixed to the frame at the lower mechanism 10, it would be difficult to detect the load of the subject with high accuracy. This is because a lower part of the cylinder 331 of the actuator 33 is supported by the lower mechanism 10, and a part of the load of the subject on the bed plate BP applied to the upper mechanism 20 is transmitted to the lower mechanism 10 via the actuator 33.

In the support structure 100 of the present embodiment, in the sliding brackets 121, 122, the sizes of the upper plate parts 121*a*, 122*a* in the longitudinal direction are smaller than the sizes of the lower plate parts 121*b*, 122*b* in the longitudinal direction. Further, in the sliding brackets 221, 222, the sizes of the lower plate parts 221*b*, 222*b* (the upper surface is a "second surface" in the present invention) in the longitudinal direction are smaller than the sizes of the upper plate parts 221*a*, 222*a* (the lower surface is a "first surface" in the present invention) in the longitudinal direction. Accordingly, in the manufacture of the support structure 100 or the like, the lower shaft 321 and the upper shaft 312 of the raising/lowering mechanism 30 can be easily arranged at the inside of the brackets via regions (introduction ports) of the sliding brackets 121, 122, 221, 222 where the upper plate parts 121*a*, 122*a* and the lower plate parts 221*b*, 222*b* do not exist.

Note that, in the present embodiment, the regions (introduction ports) where the upper plate parts 121*a*, 122*a* and the lower plate parts 221*b*, 222*b* do not exist are positioned at the leg side of the support structure 100 in the vertical direction, but the regions (introduction ports) where the upper plate parts 121*a*, 122*a* and the lower plate parts 221*b*, 222*b* do not exist may be positioned at the head side.

In addition, as described above, because the load sensors S11 to S14 are provided outside the movable range of the upper shaft 312, it is possible to detect the load of the subject with high accuracy, regardless of the position of the upper shaft 312.

According to the load sensor kit of the present embodiment, the same effects as the effects described above can be obtained.

Modifications

In the embodiment described above, the following modified examples can also be used.

In the embodiment described above, the sliding brackets 221, 222 and the fixed brackets 231, 232 are all attached to the upper frame 21 using the load sensors, but the attachment is not limited to this. At least one of the sliding bracket 221 or 222 or at least one of the fixed bracket 231 or 232 may be attached to the upper frame 21 using the load sensors while the other brackets may be fixed to the upper frame 21 in a conventional manner, such as welding, for example.

In the embodiment described above, each of the sliding brackets 221, 222 and the fixed brackets 231, 232 is attached to the upper frame 21 using four load sensors, but the number is not limited to this. The sliding brackets 221, 222 and the fixed brackets 231, 232 may be attached to the upper frame 21 using any number of load sensors.

Specifically, for example, the sliding bracket 221 may be attached to the upper frame 21 by the two load sensors of the load sensor S11 at an upper side of one end side and the load sensor S13 at an upper side of the other end side of the sliding bracket 221, or may be attached by the two load sensors of the load sensor S12 at a lower side of one end side and the load sensor S14 at a lower side of the other end side of the sliding bracket 221. Alternatively, the sliding bracket 221 may be fixed to the upper frame 21 by a single load sensor disposed at an upper side or a lower side of a central part of the sliding bracket 221 in the longitudinal direction.

In the embodiment described above, the load sensor kit includes a total of 16 load sensors, but the number is not limited to this. The number of load sensors (attachment tools, fixing tools) included in the load sensor kit may be changed as desired in accordance with the number used for attaching the brackets to the upper frame 21.

In the embodiment described above, stop plates extending in a plane orthogonal to the longitudinal direction of the sliding brackets 121, 122, 221, 222 may be provided at end parts of the sliding brackets 121, 122, 221, 222 in the longitudinal direction.

In the embodiment described above, rollers may be provided at both end parts of the upper shaft 312, and the rollers may be rolled in the sliding brackets 221, 222.

In the embodiment described above, the fixed brackets 231, 232 are attached to the upper frame 21 by the couplers 24, but attachment is not limited to this. For example, end parts of the flexure elements SB of each load sensor S21 to S24 may be directly attached to the flat plate parts 231*a*, 232*a* of the fixed brackets 231, 232. In the present invention, the "flexure element fixed to the secondary supported member" includes both a mode with the flexure element directly fixed to the secondary support member and a mode with the flexure element fixed to the secondary support member via a member such as the coupler 24.

Figure 9:
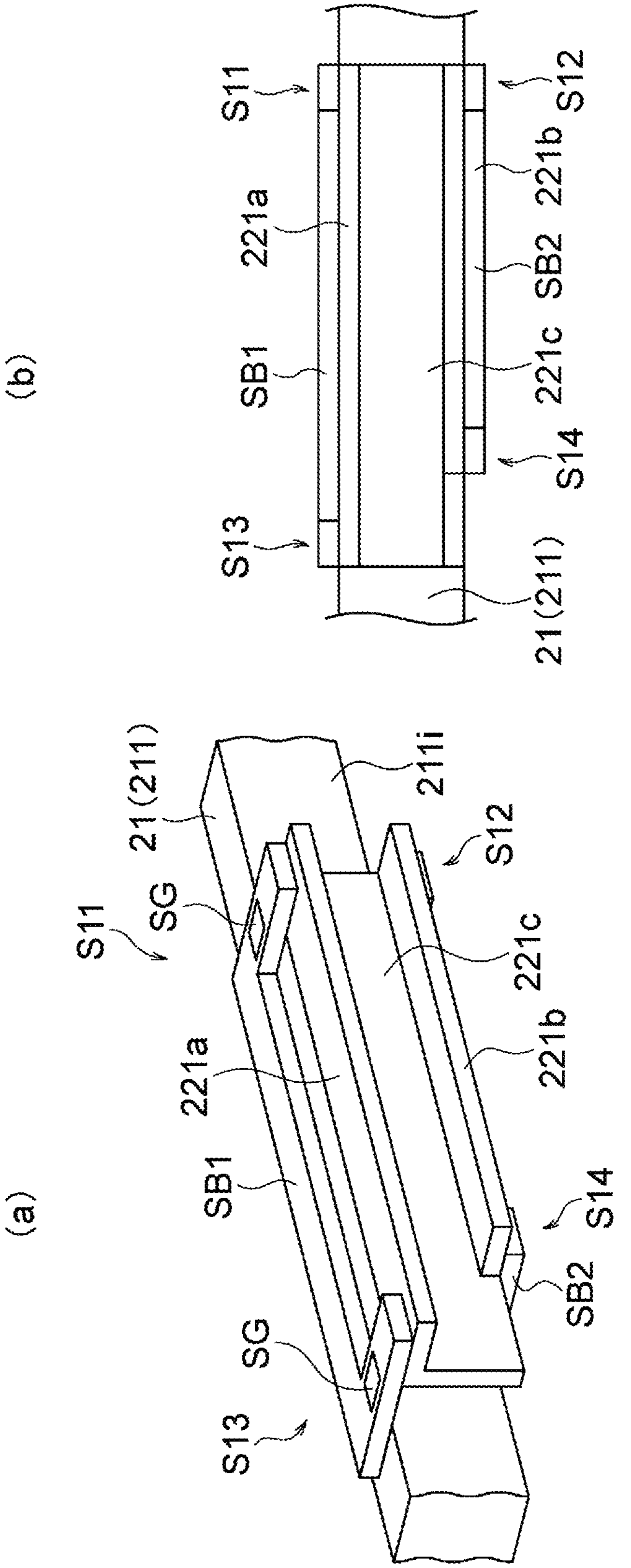
FIG. 9(*a*) is a perspective view illustrating a modified example of a structure of the sliding bracket fixed to the upper frame using the load sensors.

In the embodiment described above, the configurations of the load sensors S11 to S14 and S21 to S24 can be changed as desired. Specifically, for example, a flexure element having a plate shape may be provided instead of the flexure element SB having a beam shape. Further, the flexure elements of the plurality of load sensors may be integrally formed. For example, as illustrated in FIG. 9(*a*) and FIG. 9(*b*), the flexure elements of the load sensor S11 and the load sensor S13 may be flexure elements SB1, each being a flat plate having a C-shape (U-shape) in plan view, and the flexure elements of the load sensor S12 and the load sensor S14 may be flexure elements SB2, each being a flat plate having a C-shape (U-shape) in plan view. Similarly, although not illustrated, the flexure elements of the load sensor S21 and the load sensor S23 may be flexure elements being flat plates having a C-shape (U-shape) in plan view, and the flexure elements of the load sensor S22 and the load sensor S24 may be flexure elements being flat plates having a C-shape (U-shape) in plan view. This makes it possible to suppress rotation of the sliding brackets 221, 222 and the fixed brackets 231, 232 attributable to a force in the vertical direction (longitudinal direction) of the bed BD being applied to the upper frame 21.

As long as the features of the present invention are maintained, the present invention is not limited to the embodiments described above, and other forms considered within the scope of the technical concept of the present invention are also included within the scope of the present invention.

REFERENCE SIGNS LIST

10 Lower mechanism; 11 Lower frame; 121, 122, 221, 222 Sliding bracket; 131, 132, 231, 232 Fixed bracket; 20 Upper mechanism; 21 Upper frame; 30 Raising/Lowering mechanism; 311, 321 Lower shaft; 312, 322 Upper shaft; 313 Inner arm; 323 Outer arm; 33 Actuator; BD Bed

The invention claimed is:

1. A fixing member used in a support structure for a bed, the support structure including a lower frame, an upper frame, a raising/lowering mechanism configured to raise and lower the upper frame with respect to the lower frame, and including a support shaft extending in a width direction of the bed, and a supported member fixed to the upper frame and supported by the support shaft, the support shaft moving in a longitudinal direction of the bed while supporting the supported member when the upper frame is raised and lowered, the fixing member comprising:

a plurality of fixing tools configured to fix the supported member to the upper frame, wherein each of the plurality of fixing tools includes a flexure element fixed to the upper frame at one end and fixed to the supported member at the other end, and a strain gauge attached to the flexure element.

2. The fixing member according to claim 1, wherein the supported member is an elongated member extending in the longitudinal direction of the bed, and the plurality of fixing tools include a first fixing tool provided at an upper side of one end side of the supported member in an elongated direction, a second fixing tool provided at a lower side of the one end side of the supported member in the elongated direction, a third fixing tool provided at upper side of the other end side of the supported member in the elongated direction, and a fourth fixing tool provided at a lower side of the other end side of the supported member in the elongated direction.

3. The fixing member according to claim 2, wherein the first fixing tool, the second fixing tool, the third fixing tool, and the fourth fixing tool are provided outside a movable range of the support shaft of the supported member.

4. The fixing member according to claim 1, wherein the raising/lowering mechanism of the support structure further includes a secondary support shaft extending in the width direction of the bed, the support structure further includes a secondary supported member fixed to the upper frame and supported by the secondary support shaft, the fixing member further includes a plurality of secondary fixing tools for fixing the secondary supported member to the upper frame, and each of the plurality of secondary fixing tools includes a flexure element fixed to the upper frame at one end and fixed to the secondary supported member at the other end, and a strain gauge attached to the flexure element.

5. A support structure for a bed, the support structure comprising:

a lower frame;

an upper frame;

a raising/lowering mechanism configured to raise and lower the upper frame with respect to the lower frame, and including a support shaft extending in a width direction of the bed;

a supported member supported by the support shaft; and a fixing tool configured to fix the supported member to the upper frame, wherein the fixing tool includes a flexure element fixed to the upper frame at one end and fixed to the supported member at the other end, and a strain gauge attached to the flexure element, and the support shaft moves in a longitudinal direction of the bed while supporting the supported member when the upper frame is raised and lowered.

6. The support structure according to claim 5, wherein the supported member is an elongated member extending in the longitudinal direction of the bed, and the fixing tool includes a first fixing tool provided at an upper side of one end side of the supported member in an elongated direction, a second fixing tool provided at a lower side of the one end side of the supported member in the elongated direction, a third fixing tool provided at an upper side of the other end side of the supported member in the elongated direction, and a fourth fixing tool provided at a lower side of the other end side of the supported member in the elongated direction.

7. The support structure according to claim 6, wherein the first fixing tool, the second fixing tool, the third fixing tool, and the fourth fixing tool are provided outside a movable range of the support shaft of the supported member.

8. The support structure according to claim 6, wherein the supported member includes a first surface abutted by the support shaft, and a second surface opposing the first surface at a lower side of the first surface, and the first surface is longer than the second surface in the longitudinal direction of the supported member.

9. The support structure according to claim 5, wherein the raising/lowering mechanism further includes a secondary support shaft extending in the width direction of the bed, the support structure further includes a secondary supported member fixed to the upper frame and supported by the secondary support shaft, and a secondary fixing tool configured to fix the secondary supported member to the upper frame, and the secondary fixing tool includes a flexure element fixed to the upper frame at one end and fixed to the secondary supported member at the other end, and a strain gauge attached to the flexure element.

10. A bed comprising:

the support structure according to claim 5; and a bed plate attached to the upper frame.

* * * * *